United States Patent [19]

Kruseman et al.

[11] 4,129,664

[45] Dec. 12, 1978

[54] PROCESS FOR THE PRODUCTION OF A VEGETABLE-BASED SWEETENED CONDENSED MILK

[75] Inventors: Jan Kruseman, Tatroz; Pierre Y. Bertschy, Chardonne; Jaime Hidalgo, La Tour-de-Peilz, all of Switzerland

[73] Assignee: Societe d'Assistance Technique pour Produits Nestle S.A., La Tour de Peilz, Switzerland

[21] Appl. No.: 876,512

[22] Filed: Feb. 9, 1978

Related U.S. Application Data

[63] Continuation of Ser. No. 738,877, Nov. 4, 1976, abandoned.

[30] Foreign Application Priority Data

Nov. 14, 1975 [CH] Switzerland .................. 14787/75

[51] Int. Cl.² .................. A23C 11/00; A23L 1/20
[52] U.S. Cl. .................. 426/7; 426/46; 426/52; 426/587; 426/598; 426/656; 426/658
[58] Field of Search .................. 426/44, 46, 7, 51, 52, 426/60, 587, 598, 601, 602, 613, 656, 658

[56] References Cited

U.S. PATENT DOCUMENTS

| Re. 28,810 | 5/1976 | Tsumura et al. | 426/46 |
|---|---|---|---|
| 1,175,467 | 3/1916 | Melhuish | 426/46 X |
| 2,728,759 | 12/1955 | Kiel | 426/656 X |
| 3,220,851 | 11/1965 | Rambaud | 426/46 |
| 3,585,047 | 6/1971 | Fujimaki et al. | 426/46 |
| 3,764,711 | 10/1973 | Melnychyn et al. | 426/656 |
| 3,941,890 | 3/1976 | Drachenberg et al. | 426/46 |

OTHER PUBLICATIONS

L. M. Lampert, "Modern Dairy Products", Chemical Publ. Co., Inc., N.Y. 1965, pp. 241-242.

*Primary Examiner*—Robert A. Yoncoskie
*Attorney, Agent, or Firm*—Watson, Leavenworth, Kelton & Taggart

[57] ABSTRACT

A process is provided for the production of a vegetable-based sweetened condensed milk in which a vegetable protein in the form of an aqueous solution or suspension is subjected to partial enzymatic hydrolysis and a mixture containing approximately 4 to 9 parts by weight of fats, 8 to 18 parts by weight of the treated protein, 0 to 14 parts by weight of lactose, 40 to 55 parts by weight of sucrose and 25 to 32 parts by weight of water is prepared. Preferably the protein is subjected to an acetylation treatment before the mixture is prepared. The enzyme may be a microbial protease and the enzyme treatment is preferably carried out over a period of from about 1 to 24 hours at a temperature from about 25° to 65° C and at a pH of about 2 to 9. The protein is preferably a protein of Leguminosae, especially soya, or a yeast protein.

8 Claims, No Drawings

PROCESS FOR THE PRODUCTION OF A VEGETABLE-BASED SWEETENED CONDENSED MILK

This is a continuation, of application Ser. No. 738,877, filed Nov. 4, 1976, now abandoned.

This invention relates to a process for the production of a vegetable-based sweetened condensed milk.

Various kinds of vegetable-based substitutes for the milk of certain mammals, such as the cow, have been known for some considerable time. Thus, it is known that milk substitutes of this type can be obtained from cuttings of vegetables, such as brussel sprouts, or from coconuts or, above all, from seeds of Leguminosae, especially soya. In every case, the object is to obtain a colloidal solution of which the composition, appearance and nutritive value are reminiscent of those of an animal milk. This object is achieved by various processes of extraction, purification and titration which hardly contain any secrets. It is also known that it is often possible to produce from these milks, possibly at the expense of a slight adjustment in their composition, all kinds of products which are similar to the various standard dairy products, such as cheese and yoghurt.

However, there is a significant gap in this group of known processes and products insofar as vegetable-based sweetened condensed milk, more especially a product which will keep for more than a year, is virtually unknown. Although there is a process for producing a sweetened condensed milk from almonds, the starting material in question is far too expensive to ever be considered for the industrial production of a competitive substitute for cow's milk. In fact, taking the case of soya, one of the most interesting products both from the economic and from the nutritive point of view, it is noticeable that, although experts may talk of evaporated milks, they never talk in terms of sweetened condensed milks, and that the dry matter content of these evaporated milks does not exceed about 25%.

Despite the fact that known works on the enzymatic modification of proteins have enabled progress to be made in efforts to control the tendency of vegetable proteins, especially soya, to gel in concentrated solutions, there has as yet been no solution to the problem of producing vegetable-based sweetened condensed milk. This is because the problem is serious. To realise its seriousness, it is sufficient to remember that a standard sweetened condensed cow's milk has a dry matter content of the order of 75% by weight, of which approximately 45% is sugar, which gives approximately 30 parts of milk solids diluted in an aqueous sugar solution containing 45 parts of sugar to about 25 parts of water.

The present invention is the outcome of the search for a solution to this problem.

The present invention provides a process for the production of a vegetable-based sweetened condensed milk, which comprises subjecting a vegetable protein in the form of an aqueous solution or suspension to partial enzymatic hydrolysis, and preparing a mixture containing approximately 4 to 9 parts by weight of fats, 8 to 18 parts by weight of the treated protein, 0 to 14 parts by weight of lactose, 40 to 55 parts by weight of sucrose and 25 to 32 parts by weight of water.

The product obtained by the process according to the invention has a pleasant taste. It is stable. It does not gel, even after prolonged storage.

The process according to the invention may be carried out with all kinds of starting materials rich in proteins, such as the seeds of Leguminosae, especially soya, or microorganisms cultivated for their richness in proteins, especially yeasts.

A sweetened condensed milk based on soya proteins may be produced for example from defatted flour, a protein concentrate or a protein isolate. In cases where a defatted soya flour is used as starting material, it may be subjected to an acid (pH-value below 3) or neutral (pH-value above 6.5) or even slightly alkaline extraction process. A solid residue may be separated from the extract, for example by filtration or centrifuging. The proteins present in the supernatant phase may be purified either by ultra-filtration or by isoelectric precipitation, separation and washing for example.

The enzymatic hydrolysis of the vegetable protein is carried out in aqueous solution or suspension. It may be carried out at a temperature of from about 25° C. to 65° C. over a period ranging from about 1 to 24 hours and at a pH-value of from about 2 to 9, depending on the enzyme. It may be carried out either in batches or continuously in columns containing the enzymes fixed by a support. The enzyme is preferably selected from enzymes of microbial origin, especially bacterial enzymes.

On completion of the enzymatic treatment, the solution or suspension of proteins, obtained from soya or from yeasts for example, may be subjected to an acetylation process intended to increase the whitening power of the end product. This treatment may be carried out over a period of about 20 to 120 minutes at a temperature of from 0° to 30° C. and at pH-value of about 6.5 to 10. Acetic anhydride may be used as the acetylating agent in a quantity of about 1 part to 10 parts by weight of protein for example. The acetylation treatment may optionally be followed by a purification treatment in the form of isoelectric precipitation and by washing.

The solution or suspension of optionally acetylated proteins may be either concentrated or dried before mixing with the other ingredients included in the composition of the end product. Generally, it is preferred to dry the solution, for example by freeze-drying or by spray drying. The various ingredients may then be mixed in the required proportions. The fat, of which there are about 4 to 9 parts in this mixture, may be soya oil, a hydrogenated vegetable fat or any other fat or mixture of vegetable and animal fats with the required physical and nutritional properties. Lactose will be added in cases where it is necessary to comply with formulations requiring, for example, a given percentage of non-fat solids different from sucrose in the end product. It is also possible, if necessary, to add salts of the kind commonly encountered in formulations for sweetened condensed milk, such as calcium carbonate or a phosphate for example, in a proportion of from 0 to 3% by weight, based on the end product.

Once the various ingredients have been thoroughly mixed, the vegetable-based sweetened condensed milk obtained may be pasteurised and homogenised in order further to improve its texture and stability. In this connection, if lactose has been added to the formulation, it is advisable to crystallise it by conventional methods.

The invention is illustrated by the following Examples, in which the parts and percentages quoted are by weight.

EXAMPLE 1

1.5 kg of defatted soya flour are extracted for 45 minutes at ambient temperature in 9 liters of water of which the pH-value has been lowered to 2.6 by the addition of phosphoric acid. After the removal of a solid residue by centrifuging for 15 minutes at 4000 G, the supernatant phase is collected and sodium hydroxide is added to it until its pH-value reaches 4.5. The proteins which have precipitated are collected by centrifuging and are washed three times with water at pH 4.5. They are then dispersed in 9 liters of water of which the pH is adjusted to 7.2 by the addition of sodium hydroxide. 0.9 g of mixture of proteolytic enzymes of *Streptomyces griseus* (Pronase E, a product of Merck AG, Germany) having an activity of 70 Kunitz units per mg are then added, followed by incubation at 37° C. for 4 hours during which the pH is kept at 7.2. The enzymes are inactivated by heating for 20 minutes at 95° C. The solution is frozen and freeze-dried.

90 g of hydrogenated vegetable fat, 100 g of the protein obtained in the manner described above, 500 g of sucrose and 310 g of water are thoroughly mixed. The mixture is homogenised in a turbine homogeniser and then introduced into cans which are sterilised for 20 minutes at 100° C.

After storage for 3 months at 20° C. and at 30° C., the product has not gelled. It has a pleasant, slightly fruity taste subtly reminiscent of nuts without any hint of bitterness.

EXAMPLE 2

20 kg of defatted soya flour are extracted for 30 minutes at ambient temperature in 120 kg of water of which the pH-value has been lowered to 2.7 by the addition of phosphoric acid. After centrifuging for 20 minutes at 3500 G, the supernatant phase is collected. The pH of the supernatant phase is adjusted to 4.5 by the addition of sodium hydroxide. 85% of the proteins precipitate. They are collected by centrifuging, suspended in 120 kg of water and the pH-value adjusted to pH 7. They are then hydrolysed for 4 hours at 37° C. with 30 g of the mixture of enzymes mentioned in Example 1. Hydrolysis is terminated by heating to 100° C. The solution is cooled and dried by spray drying.

15.1% of the proteins obtained, 6.9% of lactose, 7% of hydrogenated soya fat, 43% of sucrose and 28% of water are mixed. 33 kg of vegetable sweetened condensed milk with a viscosity of 5280 centipoises (cP) are obtained. After storage for 3 months at 20° C., the viscosity has risen to only 5400 cP and, after 1 month at 37° C., it has only risen to 7200 cP. The product is stable in hot coffee. It has a neutral, if anything slightly fruity taste.

EXAMPLE 3

0.25 kg of defatted soya flour are extracted for 30 minutes at ambient temperature in 2.25 liters of water of which the pH-value has been lowered to 2.7 by the addition of phosphoric acid. The extract is centrifuged at 3000 G for 20 minutes at ambient temperature. The pH-value of the supernatant phase is adjusted to 4.9 by the addition of sodium hydroxide. The precipitate is collected by centrifuging and suspended in 2.5 liters of demineralised water. The suspension is neutralised to pH 7.2 by the addition of sodium hydroxide, followed by the addition of 0.68 g, which is equivalent to 8000 ppm of the dry matter of the solution, of an enzyme of *Bacillus cereus* in powder form having an activity of 1000 units according to Keay and Wildi per mg. The enzyme is then incubated at 40° C. for 4 hours during which the pH-value is kept between 7 and 7.2. The enzyme is then inactivated by heating. The solution is frozen and freeze-dried. 83 g of hydrolysate are obtained and completely used for the production of a vegetable sweetened condensed milk. To this end, 12%, based on the total weight, of hydrolysate, 7% of hydrogenated soya fat, 35% of sucrose, 18% of lactose and 28% of water are thoroughly mixed. A vegetable condensed milk with a viscosity of 2800 cP, as measured with a Brookfield viscosimeter, is obtained.

EXAMPLE 4

A hydrolysate of soya proteins is prepared in the same way as described in Example 3, except that 6000 ppm instead of 8000 ppm of the enzyme in question are used. A vegetable sweetened condensed milk is prepared by thoroughly mixing 13%, based on the total weight, of the hydrolysate obtained, 11% of hydrogenated soya fat, 47% of sucrose and 29% of water. The product obtained has a viscosity of 4800 cP, as measured with a Brookfield viscosimeter.

EXAMPLE 5

Single-cell yeast proteins, of which the nucleic acid content has been reduced by alkaline extraction, are suspended in water in a quantity of 1 part of proteins to 20 parts of water, and the pH of the suspension is adjusted to 7.2 by the addition of NaOH. After washing to eliminate the salts, the suspension is heated to 40° C. 0.01 part of the proteolytic enzyme of *Bacillus cereus* mentioned in Example 3 is then added. The temperature is kept at 40° C. and the pH-value at 7.2 for 4 hours with constant stirring. The enzyme is inactivated and the troublesome aromas are eliminated by boiling for 20 minutes at ambient pressure. This is followed by centrifuging. The supernatant phase obtained is concentrated and dried.

500 g of the protein material obtained are mixed with 380 g of lactose, 280 g of butter oil, 1720 g of sucrose and 1120 g of water. 4 kg of sweetened condensed milk are obtained and are then pasteurised in cans for 5 minutes at 75° C. The product has a viscosity of 9400 cP after storage for 1 month at 25° C.

EXAMPLE 6

A protein hydrolysate obtained in the manner described in Example 3 is dispersed in water in a quantity of 10 parts to 100 parts of water. The pH-value is adjusted to 7.5 with NaOH. The suspension is cooled to 4° C. in an ice bath. 1 part of acetic anhydride is added and the mixture left to react at 4° C. for 90 minutes during which the pH-value is kept constant. The suspension is dried by freeze-drying.

A sweetened condensed milk is prepared with the hydrolysate thus treated in the manner described in Example 3. The product thus obtained has a distinctly greater whitening power than the product obtained in Example 3.

EXAMPLE 7

5 kg of defatted soya flour are extracted with 45 kg of water for 1 hour while stirring, the pH-value being adjusted to 7 with NaOH. After centrifuging, the supernatant phase is acidified to pH 4.5 with concentrated phosphoric acid. The protein precipitate obtained is recovered by centrifuging. It is redispersed in water and the pH-value adjusted to 7.2 with NaOH. The solution thus obtained is dried by spray drying. A protein with a nitrogen content of around 15%, equivalent to a purity of 94%, is obtained.

1 kg of this protein is dispersed in 14kg of water. The pH is adjusted to 7.5 by the addition of KOH. The suspension is heated to 60° C. on a water bath. 20 g of proteolytic enzyme of *Bacillus subtilis* (Bakterienproteinase N, a product of Rohm AG, Germany) having an activity of 140 Kunitz units per mg are then added. The mixture is stirred for a period of 24 hours during which the pH is periodically adjusted to 7.5 with KOH. The solution is then directly dried by freeze-drying.

100 g of the hydrolysate obtained are thoroughly mixed with 159 g of lactose, 82 g of hydrogenated soya fat, 505 g of sucrose and 1500 g of water. The mixture is homogenised. It is concentrated by evaporation to half its weight. It is then pasteurised by heating at 80° C., followed by cooling in a water bath. The product has a viscosity of 3600 cP at 25° C. It has not gelled after storage for 1 month at 25° C.

EXAMPLE 8

30 g of protein prepared in the same way as described in Example 7 are dispersed in 270 g of tap water. The pH is adjusted to 3 with HCl. After heating to 40° C., 0.15 g of pepsin (produced by Fluka AG, Switzerland) having an activity of 1/3000 units, according to the Manual of the USA National Formulary, 11th Edition, are added. After 3 hours, another 0.15 g of pepsin are added and left to act for another 5 hours during which the pH is kept at pH 3 with HCl and the temperature at 40° C. Hydrolysis is terminated by adjusting the pH to 7.5 with NaOH.

57 g of water, 111 g of sugar, 31 g of lactose and 18 g of hydrogenated soya fat are added to the mass obtained. The product is then mixed and homogenised. It is concentrated to half its weight by evaporation in vacuo. A sweetened condensed milk which does not gel and which has a viscosity of 22,000 cP is obtained.

We claim:

1. A process for the production of a vegetable-based sweetened condensed milk, which comprises subjecting a vegetable protein in the form of an aqueous solution or suspension to proteolytic enzymatic hydrolysis for a period of from about 4 to 24 hours at a temperature in the range of about 25° to 65° C. at a pH of about 2 to 9, the amount of proteolytic enzyme added to the solution or suspension being in the range of about 0.176 to 2% in weight of the dry matter of the solution or suspension, and preparing a mixture containing approximately 4 to 9 parts by weight of fats, 8 to 18 parts by weight of said enzymatically hydrolyzed protein, 0 to 14 parts by weight of lactose, 40 to 55 parts by weight of sucrose and 25 to 32 parts by weight of water.

2. A process according to claim 1, in which said enzymatically hydrolyzed protein is subjected to an acetylation treatment before said mixture is prepared.

3. A process according to claim 1, in which said mixture is pasteurised and homogenised.

4. A process according to claim 1, in which said enzyme is selected from the group consisting of microbial proteases.

5. A process according to claim 1, in which said protein is selected from the group consisting of the proteins of Leguminosae and yeast proteins.

6. A process according to claim 5, in which said protein is a soya protein.

7. The vegetable-based sweetened condensed milk prepared by the process of claim 1.

8. A process for the production of a vegetable-based sweetened condensed milk, which comprises subjecting a vegetable protein in the form of an aqueous solution or suspension to proteolytic enzymatic hydrolysis for a period of from about 4 to 24 hours at a temperature in the range of about 25° to 65° C. at a pH of about 2 to 9 to render said protein non-gelling, and preparing a mixture containing approximately 4 to 9 parts by weight of fats, 8 to 18 parts by weight of said enzymatically hydrolyzed protein, 0 to 14 parts by weight of lactose, 40 to 55 parts by weight of sucrose and 25 to 32 parts by weight of water.